United States Patent
Kasahara

(10) Patent No.: US 10,870,424 B2
(45) Date of Patent: Dec. 22, 2020

(54) HYBRID VEHICLE DRIVE SYSTEM

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 16/353,924

(22) Filed: Mar. 14, 2019

(65) Prior Publication Data

US 2019/0291714 A1 Sep. 26, 2019

(30) Foreign Application Priority Data

Mar. 23, 2018 (JP) .................. 2018-055598

(51) Int. Cl.
| | |
|---|---|
| *B60W 20/13* | (2016.01) |
| *B60K 6/44* | (2007.10) |
| *B60W 10/02* | (2006.01) |
| *B60K 6/36* | (2007.10) |
| *B60K 6/442* | (2007.10) |
| *B60W 10/06* | (2006.01) |

(Continued)

(52) U.S. Cl.
CPC ............. *B60W 20/13* (2016.01); *B60K 6/365* (2013.01); *B60K 6/442* (2013.01); *B60W 10/02* (2013.01); *B60W 10/06* (2013.01); *B60W 10/08* (2013.01); *B60W 10/115* (2013.01); *B60W 2510/0291* (2013.01); *B60W 2510/244* (2013.01); *B60W 2520/10* (2013.01); *B60W 2710/021* (2013.01); *B60W 2710/0644* (2013.01); *B60W 2710/081* (2013.01); *B60W 2710/1005* (2013.01); *B60Y 2200/92* (2013.01)

(58) Field of Classification Search
CPC ...... B60W 20/13; B60W 10/02; B60W 10/06; B60W 10/08; B60W 10/115; B60W 2710/1005; B60W 2510/0291; B60W 2510/244; B60W 2520/10; B60W 2710/021; B60W 2710/0644; B60W 2710/081; B60W 20/20; B60W 20/40; B60K 6/442; B60K 6/365; B60K 2006/381; B60K 6/383; B60K 6/387; B60K 6/445; B60K 6/26; B60Y 2200/92; Y02T 10/62

See application file for complete search history.

(56) References Cited

U.S. PATENT DOCUMENTS

2009/0159349 A1* 6/2009 Ebuchi ................ B60W 10/115
180/65.235

FOREIGN PATENT DOCUMENTS

WO 2013014777 A1 1/2013

\* cited by examiner

*Primary Examiner* — Rodney A Butler
(74) *Attorney, Agent, or Firm* — Duft & Bornsen, PC

(57) ABSTRACT

A drive system of a hybrid vehicle including an internal combustion engine, a first motor-generator, a first power transmission path and a second power transmission path, a power division mechanism, a second motor-generator, a clutch portion provided at the power transmission path to make or break the first power transmission path, and a microprocessor. The microprocessor is configured to determine whether a drive in a region exceeding a characteristic curve of a driving force defined by a sum of a driving force output through the first power transmission path and a driving force of the second motor-generator at a low vehicle speed is necessary, and to control the clutch portion to a half-clutch state when determining that the drive in the region is necessary, while connecting or disconnecting the clutch portion when determining that the drive in the region is not necessary.

8 Claims, 15 Drawing Sheets

(51) Int. Cl.
*B60W 10/08* (2006.01)
*B60W 10/115* (2012.01)
*B60K 6/365* (2007.10)

|  | BR | CL | OWY | ENG |
|---|---|---|---|---|
| EV MODE | × | × | × | × |
| W MOTOR MODE | × | ○ | ○ | × |
| SERIES MODE | ○ | ○ | × | ○ |
| HV MODE LOW | × | ○ | ○ | ○ |
| HV MODE HIGH | ○ | × | ○ | ○ |

EV MODE

W MOTOR MODE

SERIES MODE

HV LOW MODE

HV HIGH MODE

EV MODE

W MOTOR MODE

ENGINE START

HV HIGH MODE

HV LOW MODE

HYBRID VEHICLE DRIVE SYSTEM

CROSS-REFERENCE TO RELATED APPLICATION

This application is based upon and claims the benefit of priority from Japanese Patent Application No. 2018-055598 filed on Mar. 23, 2018, the content of which is incorporated herein by reference.

BACKGROUND OF THE INVENTION

Field of the Invention

This invention relates to a drive system of a hybrid vehicle including a speed change mechanism.

Description of the Related Art

Conventionally, there is a known apparatus of this type that includes an engine and a pair of rotating electrical machines, wherein motive power from the engine is divided by a first planetary gear mechanism to a first rotating electrical machine and a second planetary gear mechanism side, and an associated vehicle is adapted to travel under motive power output through the second planetary gear mechanism and motive power of the second rotating electrical machine. Such a unit is described in, for example, International Publication No. 2013/014777 (WO2013/014777A). The apparatus described in WO2013/014777A includes a clutch and a brake connected to the second planetary gear mechanism, and drive mode is switched in response to engaging actions of the clutch and brake. When the vehicle travels using both the first rotating electrical machine and second rotating electrical machine as power sources, the clutch and brake are both engaged and the engine is stopped.

Since the apparatus described in WO2013/014777A uses both the first rotating electrical machine and the second rotating electrical machine as power sources, it enables performance of high-load traveling at low speed such as during hill climbing. However, in order to realize high-load traveling with a pair of rotating electrical machines as power sources, state of charge of battery not less than a predetermined value must be ensured, so that high-load traveling at low speed is hard to achieve with battery in low state of charge.

SUMMARY OF THE INVENTION

An aspect of the present invention is a drive system of a hybrid vehicle including: an internal combustion engine; a first motor-generator; a power transmission path including a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a clutch portion including friction elements engageable and disengageable with each other to connect or disconnect so as to make or break the first power transmission path in accordance with an engagement and an disengagement of the friction elements; and an electronic control unit including a microprocessor and a memory and configured to perform controlling the internal combustion engine, the first motor-generator, the second motor-generator and the clutch portion. The microprocessor is configured to perform determining whether a drive in a region exceeding a characteristic curve of a driving force defined by a sum of a driving force output through the first power transmission path and a driving force of the second motor-generator at a range of a vehicle speed smaller than or equal to a predetermined vehicle speed is necessary, and the controlling including controlling the clutch portion to a half-clutch state when determining that the drive in the region is necessary, while connecting or disconnecting the clutch portion when determining that the drive in the region is not necessary.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
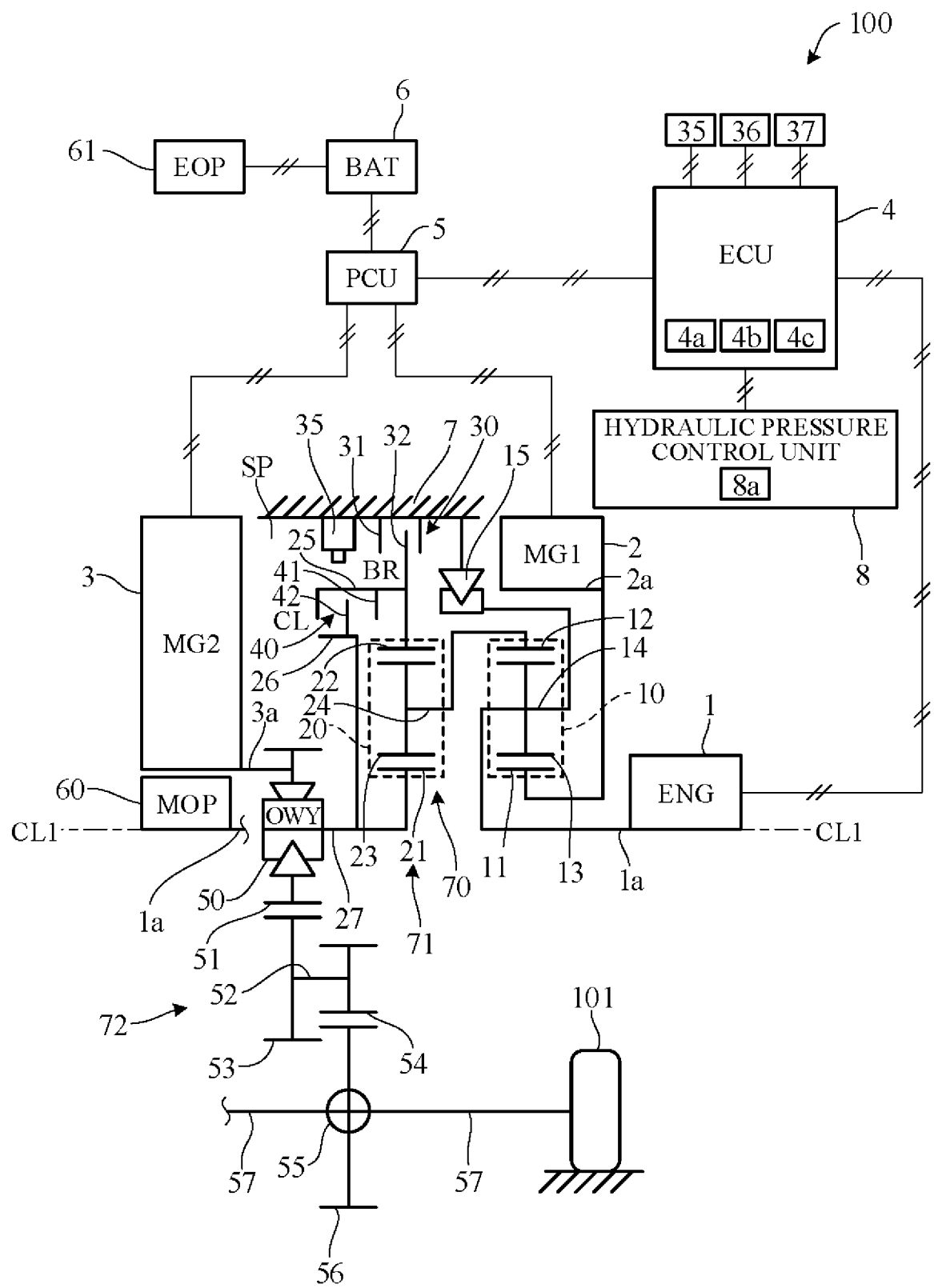
FIG. 1 is a diagram showing schematically a configuration overview of a drive system of a hybrid vehicle according to an embodiment of the invention.

Hereinafter, an embodiment of the present invention is explained with reference to FIGS. 1 to 15. A drive system according to an embodiment of the present invention is applied to a hybrid vehicle including an engine and a motor-generator as a drive power source. FIG. 1 is a diagram showing schematically a configuration overview of a drive system 100 of a hybrid vehicle according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction, and are configured as friction engagement elements.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction, and are configured as friction engagement elements. The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed change mechanism 70 configures a first power transmission path 71.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive system 100 can therefore be minimized, a smaller drive system 100 can be realized.

A mechanical oil pump (MOP) 60 is installed radially inward of the rotor of the second motor-generator 3. The mechanical oil pump 60 is connected to the output shaft 1a of the engine 1 and driven by the engine 1. Oil supply necessary when the engine 1 is stopped is covered by driving an electric oil pump (EOP) 61 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a second power transmission path 72 as a torque transmission path from the one-way clutch 50 to the axles 57. The first and second power transmission paths 71 and 72 are connected with each other in series.

The hydraulic pressure control unit 8 includes electromagnetic valve, proportional electromagnetic valve, and other control valves (control valve 8a) actuated in accordance with electric signals. The control valve 8a operates to control hydraulic pressure flow to the brake mechanism 30, clutch mechanism 40 and the like in accordance with instructions from the controller 4. More specifically, the control valve 8a controls hydraulic oil flow to an oil chamber facing piston of the brake mechanism 30 and to an oil chamber facing piston of the clutch mechanism 40. This enables ON-OFF switching of the brake mechanism 30 and clutch mechanism 40. Hydraulic oil flow to the other portion is controlled by other control valve.

The controller (ECU) 4 as an electronic control unit incorporates an arithmetic processing unit having a CPU, ROM, RAM and other peripheral circuits, and the CPU includes an engine control ECU 4a, a speed change mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the drum 25, a vehicle speed sensor 36 for detecting vehicle speed, and an accelerator opening angle sensor 37 for detecting accelerator opening angle indicative of amount of accelerator pedal depression. Although not indicated in the drawings, the controller 4 also receives signals from a sensor for detecting rotational speed of the engine 1, a sensor for detecting rotational speed of the first motor-generator 2 and a sensor for detecting rotational speed of the second motor-generator 3.

Based on these input signals, the controller 4 decides drive mode in accordance with a predefined driving force map representing vehicle driving force characteristics defined in terms of factors such as vehicle speed and accelerator opening angle. In order to enable the vehicle to travel in the decided drive mode, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve 8a).

Figures 2, 3:
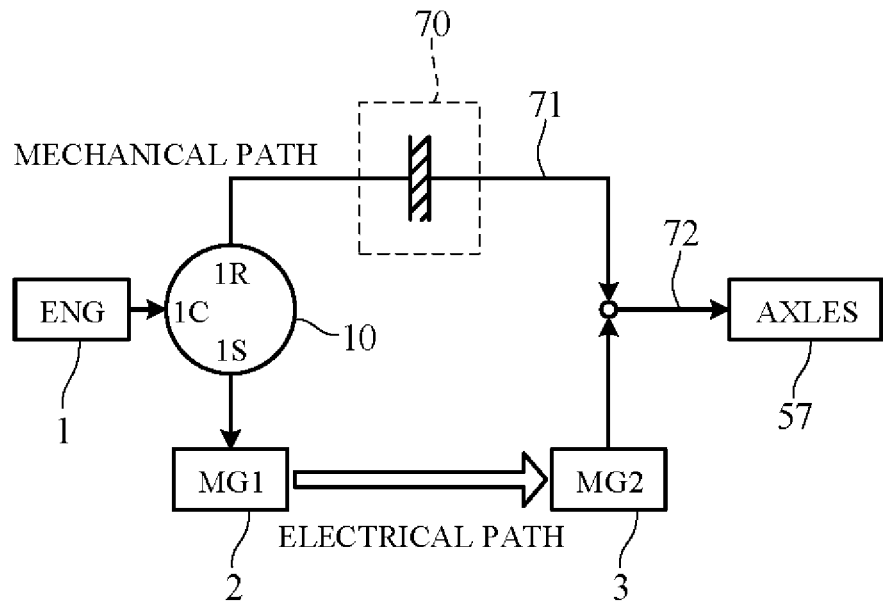
FIG. 2 is a diagram schematically illustrating torque transmission paths by the drive system of the hybrid vehicle according to the embodiment of the invention.
FIG. 3 is a diagram an example of drive modes implemented by the drive system of the hybrid vehicle according to the embodiment of the invention.

FIG. 2 is a diagram schematically illustrating torque transmission paths in HV mode, which is a typical drive mode of the drive system 100. As shown in FIG. 2, driving force of the engine (ENG) 1 in HV mode is input to the first carrier (1C) 14 of the first planetary gear mechanism 10. The input power is output from the first sun gear (1S) 11 to the first motor-generator (MG1) 2 and output from the first ring gear (1R) 12 to the first power transmission path 71.

The first motor-generator 2 driven by motive power from the engine 1 generates electricity. The generated electric power is supplied to the second motor-generator (MG2) 3 through an electrical path to drive the second motor-generator 3. Resulting driving force produced by the second motor-generator 3 is transmitted through the second power transmission path 72 to the axles 57 as travel driving force.

Rotation input to the first power transmission path 71 from the engine 1 is changed in speed in accordance with engage action and disengage action of the brake mechanism 30 and clutch mechanism 40 of the speed change mechanism 70. Driving force output from the speed change mechanism 70 is added to driving force of the second motor-generator 3 and transmitted through the second power transmission path 72 to the axles 57. In other words, sum of driving force transmitted through a mechanical path (first power transmission path 71) and driving force of the second motor-generator 3 is transmitted through the second power transmission path 72 to the axles 57 as travel driving force.

FIG. 3 is a table showing examples of some drive modes that can be implemented by the drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 3, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol ○, while brake mechanism 30 OFF (Disengaged), clutch mechanism 40 OFF (Disengaged), one-way clutch 50 Unlocked, and engine 1 Stopped are indicated by symbol x.

Figure 4:
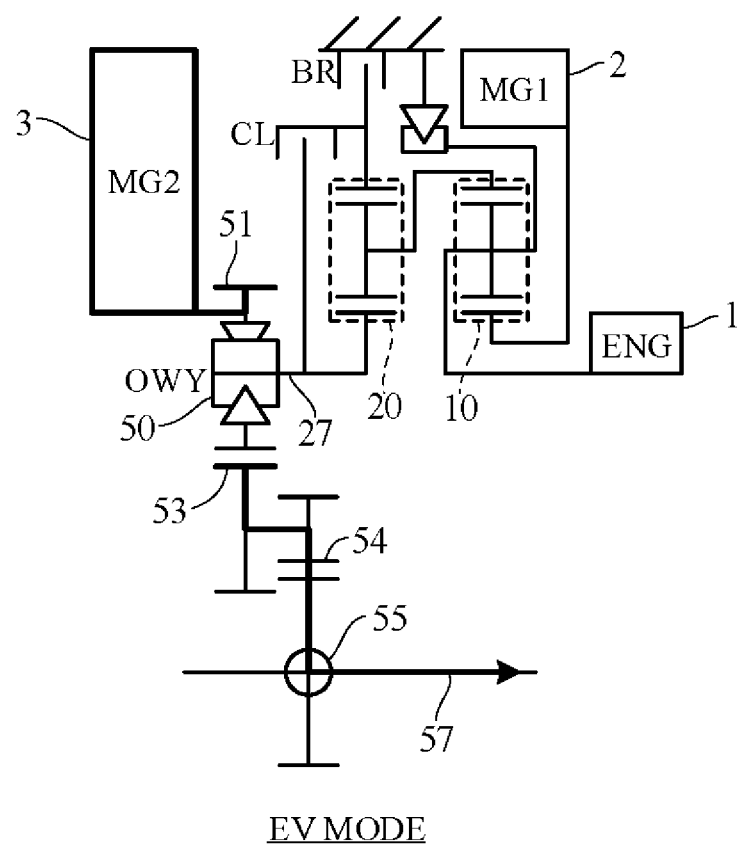
FIG. 4 is a skeleton diagram showing a flow of torque transmission in EV mode in the drive system of FIG. 1.

In EV mode, the vehicle is driven for traveling solely by motive power of the second motor-generator 3. As shown in FIG. 3, in EV mode, the brake mechanism 30 and clutch mechanism 40 are both OFF, and the engine 1 is stopped, in accordance with instructions from the controller 4. FIG. 4 is a skeleton diagram showing flow of torque transmission in EV mode.

As show in FIG. 4, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 5:
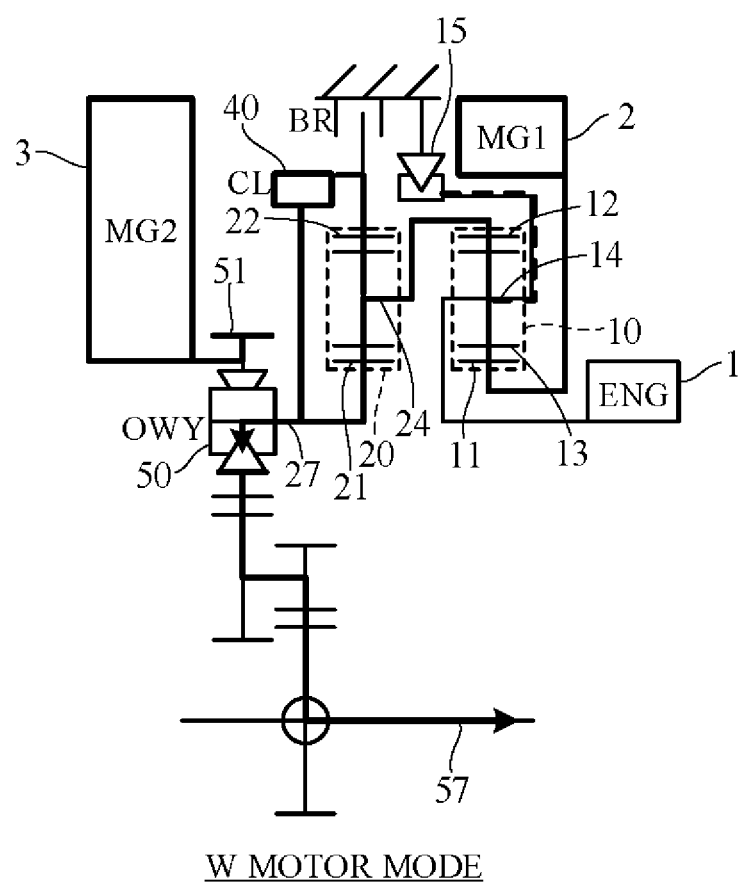
FIG. 5 is a skeleton diagram showing a flow of torque transmission in W motor mode in the drive system of FIG. 1.

In W motor mode, the vehicle is driven for traveling by motive power of the first motor-generator 2 and the second motor-generator 3. As shown in FIG. 3, in W motor mode, the brake mechanism 30 is OFF, the clutch mechanism 40 is ON and the engine 1 is stopped, in accordance with instructions from the controller 4. FIG. 5 is a skeleton diagram showing flow of torque transmission in W motor mode.

As show in FIG. 5, in W motor mode, rotation of the first carrier 14 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, driving force can be increased to greater than in EV mode. In W motor mode, generating electric by the first motor-generator 2 is not implemented. Therefore, W motor mode is implemented when state of charge of the battery 6 (SOC) is greater than or equal to predetermined value.

Figure 6:
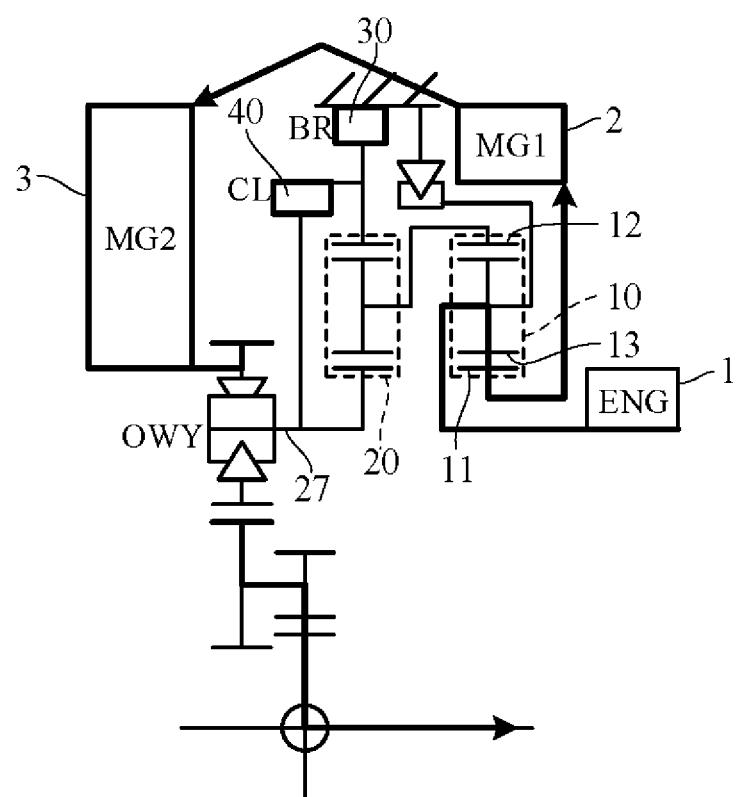
FIG. 6 is a skeleton diagram showing a flow of torque transmission in series mode in the drive system of FIG. 1.

In series mode, the vehicle is driven for traveling by motive power of the second motor-generator 3 while the first motor-generator 2 is being driven by motive power from the engine 1 to generate electric power. As shown in FIG. 3, in series mode, the brake mechanism 30 and clutch mechanism 40 are both ON and the engine 1 is operated, in accordance with instructions from the controller 4. FIG. 6 is a skeleton diagram showing flow of torque transmission in series mode.

As shown in FIG. 6, in series mode, rotation from the first ring gear 12 to as far as the output shaft 27 is stopped, so that all power output from the engine 1 is input through the first pinions 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50. Amount of power supplied to the second motor-generator 3 through the electrical path is not greater than allowable output of the power control unit 5.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 3, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 7:
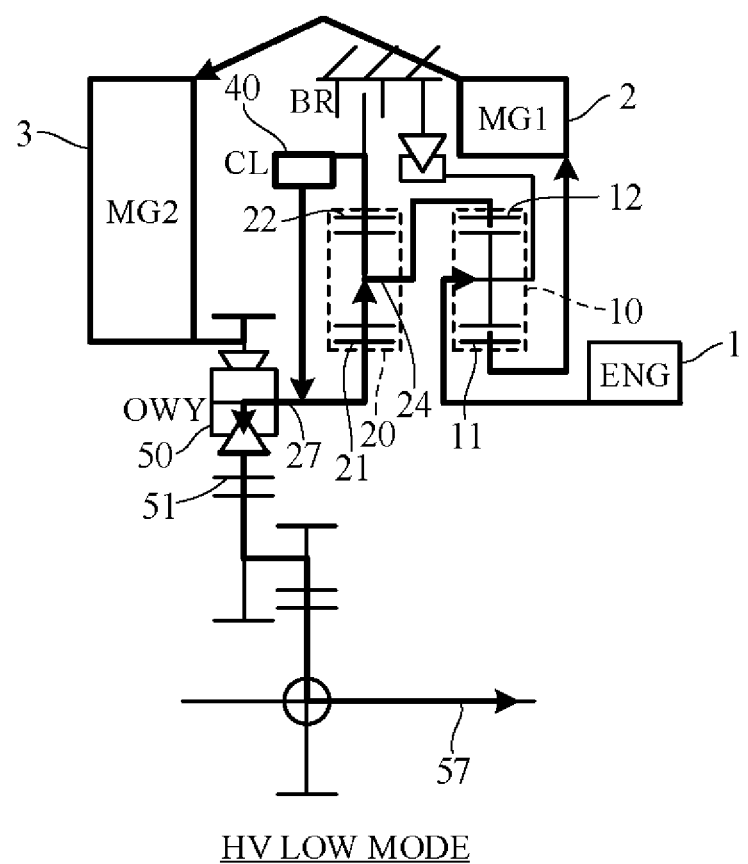
FIG. 7 is a skeleton diagram showing a flow of torque transmission in HV low mode in the drive system of FIG. 1.

FIG. 7 is a skeleton diagram showing flow of torque transmission in HV low mode. As shown in FIG. 7, in HV low mode, some torque output from the engine 1 is transmitted through the first sun gear 11 to the first motor-generator 2. As a result, the battery 6 is charged by power generated by the first motor-generator 2, and, in addition, electrical drive power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 8:
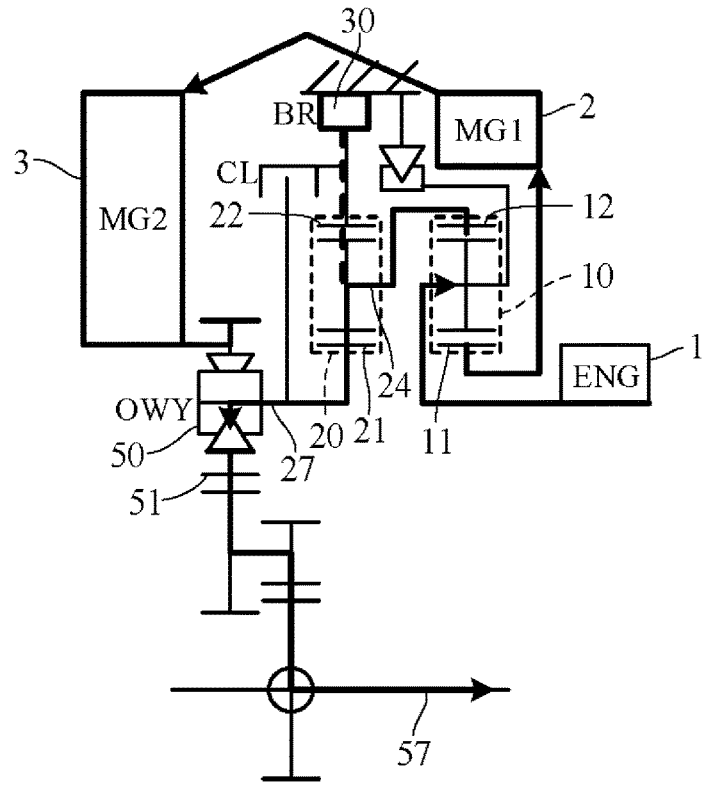
FIG. 8 is a skeleton diagram showing a flow of torque transmission in HV high mode in the drive system of FIG. 1.

FIG. 8 is a skeleton diagram showing flow of torque transmission in HV high mode. As shown in FIG. 8, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

FIGS. 9A to 9E are diagrams each showing an example of an alignment chart in a given drive mode. In the drawings, the first sun gear 11, first carrier 14 and first ring gear 12 are designated 1S, 1C and 1R, respectively, and the second sun gear 21, second carrier 24 and second ring gear 22 are designated 2S, 2C and 2R, respectively. Rotation direction of the first ring gear 12 and second carrier 24 during forward vehicle movement is defined as positive direction. Forward direction is indicated by symbol "+" and torque acting in forward direction is indicated by upward pointing arrow.

Figure 9A:
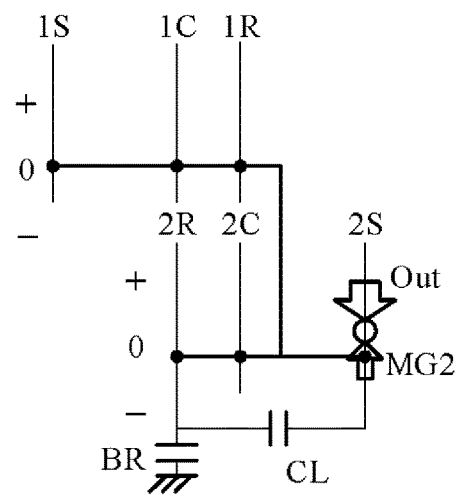
FIG. 9A is an alignment chart showing an example of operation in EV mode.

FIG. 9A is an alignment chart in EV mode. As shown in FIG. 9A, in EV mode, action of the one-way clutch 50 keeps rotation of the second sun gear 21 (2S) of the second planetary gear mechanism 20 stopped, and only the second motor-generator 3 (MG2) is driven to rotate in positive direction so that the vehicle traveling is started by driving torque from the second motor-generator 3.

Figure 9B:
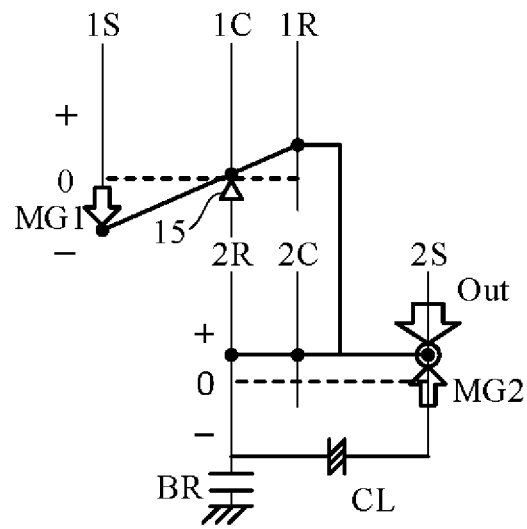
FIG. 9B is an alignment chart showing an example of operation in W motor mode.

FIG. 9B is an alignment chart in W motor mode. As shown in FIG. 9B, in W motor mode, the clutch mechanism 40 (CL) is turned ON and the first motor-generator 2 (MG1) is driven to rotate in negative direction. At this time, since the one-way clutch 15 prevents the first carrier 14 (1C) from rotating, torque of the first motor-generator 2 (MG1) is transmitted from the first ring gear 12 (1R) to the second carrier 24 (2C) as a reaction force by being supported at the one-way clutch 15. Therefore, The second sun gear 21 (2S) and second ring gear 22 (2R) integrally rotate with the second carrier 24 (2C), and torque from the second sun gear 21 is added to torque of the second motor-generator 3 (MG2), so that the vehicle travels in W motor mode.

Figure 9C:
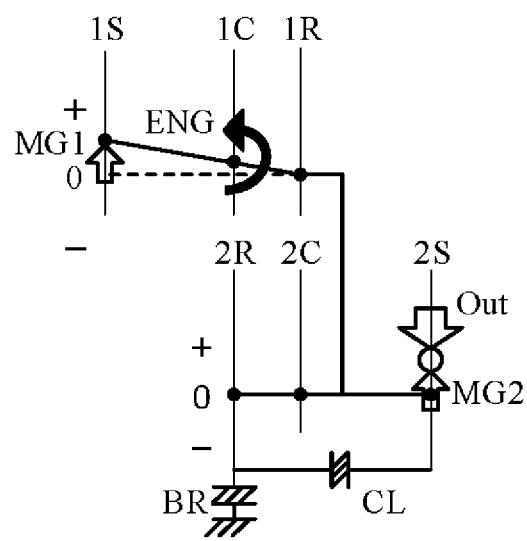
FIG. 9C is an alignment chart showing an example of operation when starting an engine in EV mode.

FIG. 9C is an alignment chart showing engine 1 starting (called "start mode") from EV mode. In start mode, as shown in FIG. 9C, while the second motor-generator 3 (MG2) is being kept rotationally driven in positive direction, the brake mechanism 30 (BR) and clutch mechanism 40 (CL) are both turned ON, and rotation of the second carrier 24 (2C) and first ring gear 12 (1R) is stopped. In this state, the first motor-generator 2 (MG1) is rotationally driven in positive direction to rotate the output shaft 1a of the engine 1 through the first carrier 14 (1C) and thereby start the engine 1.

Figure 9D:
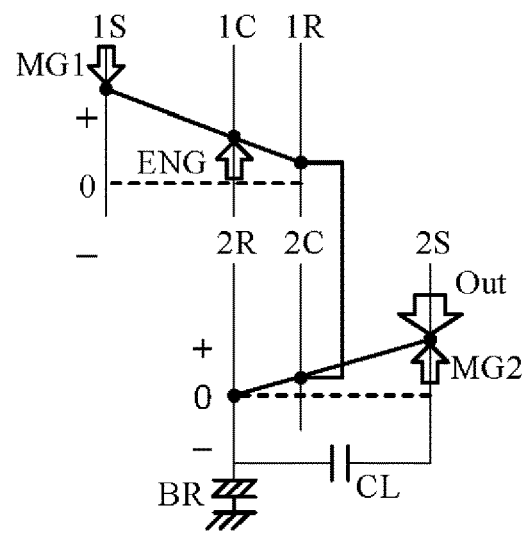
FIG. 9D is an alignment chart showing an example of operation in HV high mode.

FIG. 9D is an alignment chart in HV high mode. As shown in FIG. 9D, when drive mode is being switched to HV high mode, engine starting is followed by turning ON the brake mechanism 30 (BR) and turning OFF the clutch mechanism 40 (CL). Therefore, the first ring gear 12 (1R) is rotated in positive direction by the engine 1 and the first motor-generator 2 (MG1) starts to generate electricity, and the first ring gear 12 (1R) rotates in positive direction. Since the second ring gear 22 (2R) is stopped, the second sun gear 21 (2S) rotates at speed higher than the second carrier 24

(2C). The vehicle is traveled by this torque from the second sun gear 21 and torque of the second motor-generator 3 (MG2).

Figure 9E:
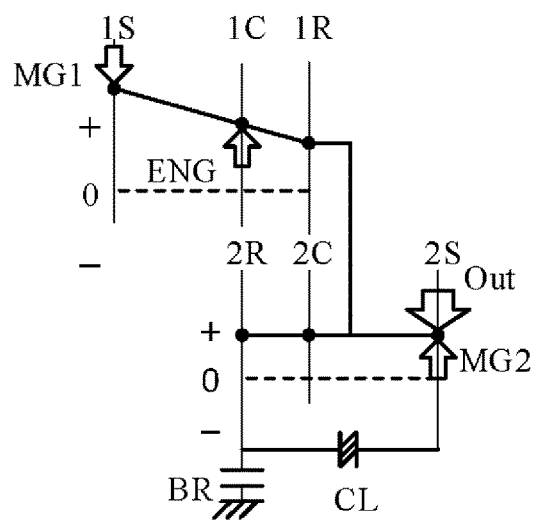
FIG. 9E is an alignment chart showing an example of operation in HV low mode.

FIG. 9E is an alignment chart in HV low mode. As shown in FIG. 9E, when drive mode is being switched to HV low mode, engine starting is followed by turning OFF the brake mechanism 30 (BR) and turning ON the clutch mechanism 40 (CL). Therefore, the first ring gear 12 (1R) is rotated in positive direction by the engine 1 and the first motor-generator 2 (MG1) starts to generate electricity, and the first ring gear 12 (1R) rotates in positive direction. In this case, since the second carrier 24 (2C), second sun gear 21 (2S) and second ring gear 22 (2R) are integrally configured, the second sun gear 21 (2S) rotates at same speed as the second carrier 24 (2C). The vehicle is traveled by this torque from the second sun gear 21 and torque of the second motor-generator 3 (MG2).

Figure 10A:
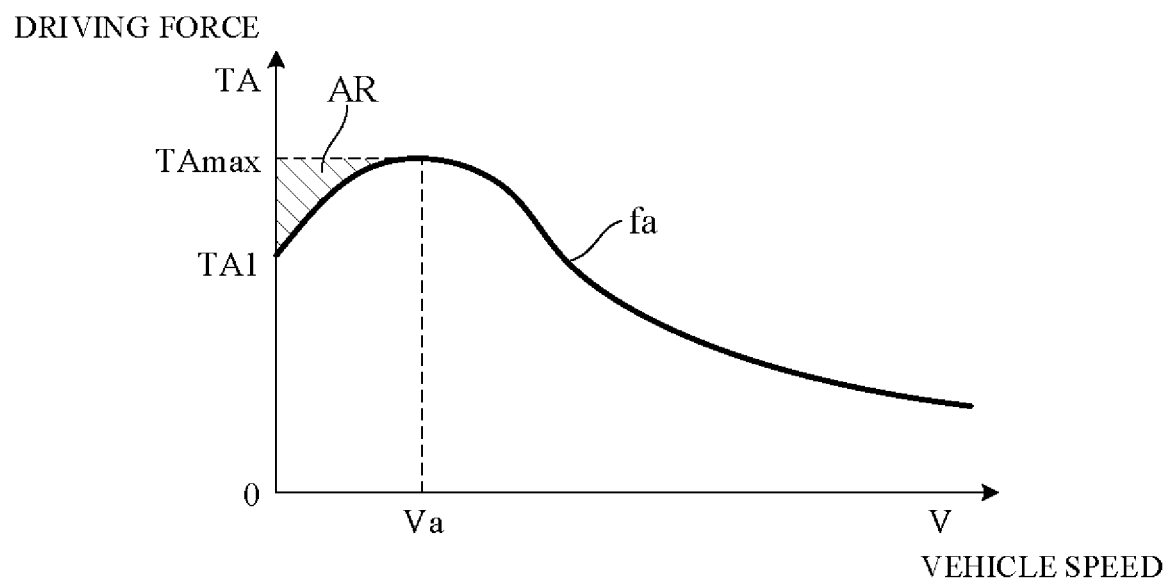
FIG. 10A is a diagram showing a characteristic curve of driving force in HV low mode of the drive system of FIG. 1.
Figure 10B:
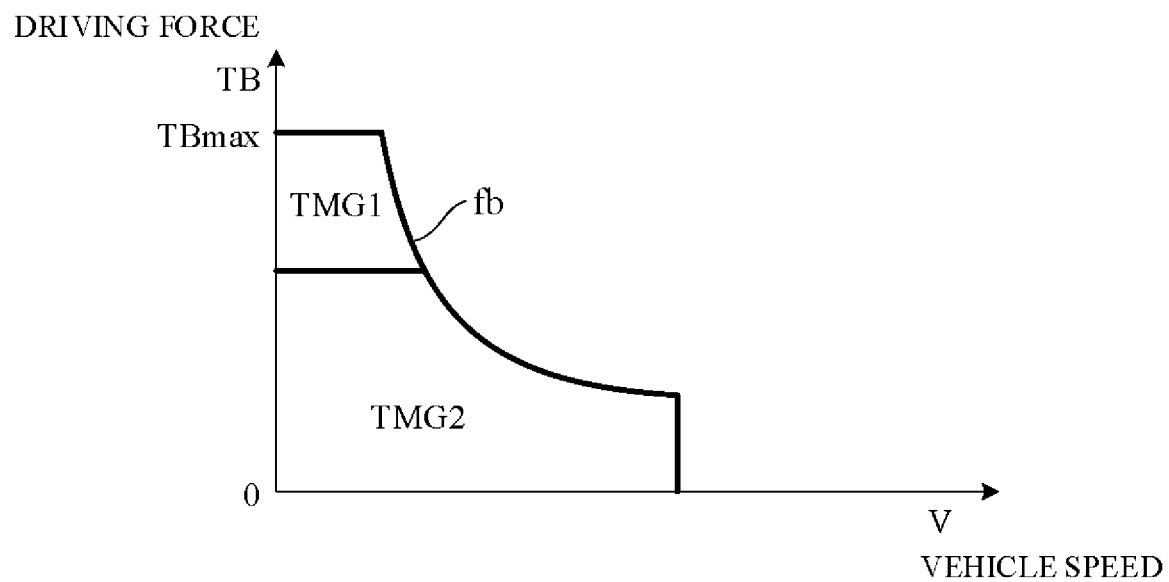
FIG. 10B is a diagram showing a characteristic curve of driving force in W motor mode of the drive system of FIG. 1.

FIGS. 10A and 10B are diagrams related to the drive system 100 of the present embodiment respectively showing examples of characteristic curves fa and fb of travel driving forces (driving forces) TA and TB relative to vehicle speed V when accelerator pedal is floored. FIG. 10A shows characteristic curve fa of driving force in HV low mode, and FIG. 10B characteristic curve fb of driving force in W motor mode. Although not illustrated in the drawing, the corresponding characteristics in HV high mode are farther to low driving force side than those represented by characteristic curve fa.

As shown in FIG. 10B, in W motor mode, sum of driving force TMG1 of the first motor-generator added to driving force TMG2 of second motor-generator 3 is output. The motor characteristics are such that total driving force TB at this time is constant in vehicle low speed range and decreases with increasing vehicle speed V. Total driving force TB in vehicle low speed range including vehicle speed 0 therefore becomes maximum value TBmax.

In HV low mode, in contrast, sum of driving force of the second motor-generator 3 added to driving force of the mechanical path from the engine 1 is output (see FIG. 2). As shown in FIG. 10A, total driving force TA in HV low mode gradually increases with increasing vehicle speed V from vehicle speed V of 0 up to predetermined vehicle speed Va (e.g., about 30 km/h), and thereafter gradually decreases with increasing vehicle speed V. Total driving force TA therefore becomes maximum value TAmax at predetermined vehicle speed Va. At a certain ratio setting, maximum value TAmax is approximately equal to maximum value TBmax in W motor mode, and in FIG. 10A driving force TA at vehicle speed of 0 is TA1. In W motor mode, traveling at vehicle speed Va is possible at maximum value TBmax.

Thus in HV low mode, driving force TA in vehicle low speed range including vehicle speed 0 becomes smaller than maximum value TAmax. This is because output of the mechanical path of FIG. 2 becomes 0 in vehicle stopped state (V=0). A point of interest here is that such vehicle low speed range characteristics are the norm in hybrid vehicles having a power division mechanism that divides and outputs engine power to a mechanical path and a motor-generator. Therefore, when high-load running is necessary, particularly at constant speed in vehicle low speed range including vehicle speed of 0, such as when starting up a slope, towing or the like, it suffices to drive in W motor mode capable of generating large torque. However, implementation of W motor mode requires state of charge of the battery 6 to be at least a predetermined value. So when state of charge is less than the predetermined value, W motor mode cannot be implemented and vehicle starting and the like at maximum torque is hard to achieve.

On the other hand, as shown in FIG. 2, the present embodiment includes the speed change mechanism 70 incorporated in the first power transmission path 71, particularly the clutch mechanism 40 as a part of the speed change mechanism 70 for connecting (making) the first power transmission path 71 in HV low mode. In this configuration, the first power transmission path 71 is broken if the clutch mechanism 40 is turned OFF. This means that mechanical path elements on the upstream side the clutch mechanism 40 (second ring gear 22 etc.) can be rotated when the vehicle is starting to move. In low speed range including vehicle speed of 0, therefore, power can be transmitted through the mechanical path to the axles 57 by putting the clutch mechanism 40 in a partially engaged state (half-clutch state). In other words, behavior can be realized that is similar to that obtained when a vehicle having a manual transmission is started at high torque or traveled at low speed by partial clutching.

In HV low mode, this enables driving force TA at not higher than predetermined vehicle speed Va shown in FIG. 10A to be increased to maximum value TAmax. Namely, vehicle drive in a region indicated by hatching in FIG. 10A (low-speed-high-load region AR), i.e., low-speed-high-load vehicle drive or constant speed vehicle drive in low-speed-high-load region AR, is enabled by controlling the clutch mechanism 40 to half-clutch state. In the present embodiment, the drive system 100 is configured as follows taking the aforesaid into consideration so as to enable starting and low speed traveling at maximum driving force TAmax.

Figure 11:
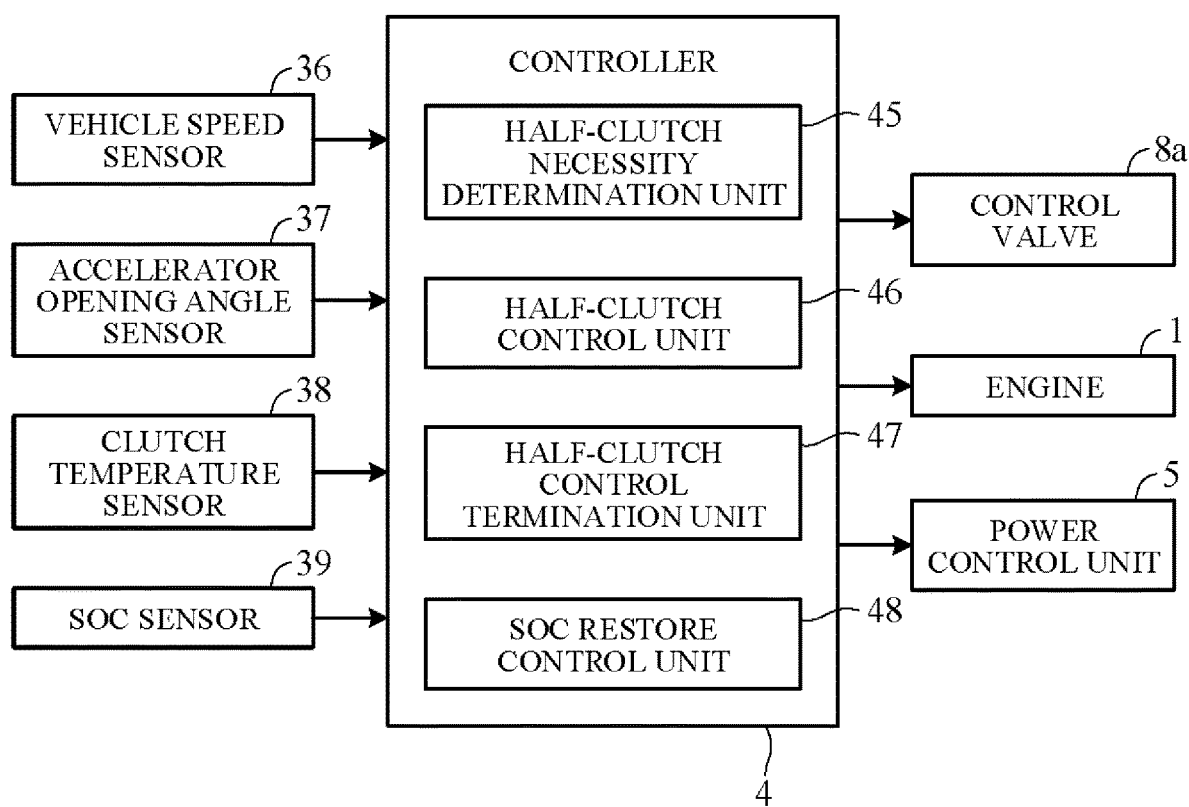
FIG. 11 is a block diagram showing main components of the drive system of the hybrid vehicle according to the embodiment of the invention.

FIG. 11 is a block diagram showing main components of the drive system 100 according to the present invention, with primary focus on control aspects in the case of running vehicle at low-speed, high-load. As shown in FIG. 11, the controller 4 receives input signals from the vehicle speed sensor 36, the accelerator opening angle sensor 37, a clutch temperature sensor 38 and an SOC sensor 39. The clutch temperature sensor 38 is a sensor for directly or indirectly detecting temperature of frictional engagement elements (plates 41 and disks 42) of the clutch mechanism 40, and consists of, for example, a temperature sensor installed near the clutch mechanism 40. Alternatively, clutch temperature can be estimated from oil temperature, rotational speed difference between plates 41 and disks 42, or other factors. The SOC sensor 39 is a sensor for detecting state of charge of the battery 6.

As functional configurations, the controller 4 includes a half-clutch necessity determination unit 45, a half-clutch control unit 46, a half-clutch control termination unit 47, and an SOC restore control unit 48.

The half-clutch necessity determination unit 45 is responsive to signals from the vehicle speed sensor 36, accelerator opening angle sensor 37 and SOC sensor 39 for determining necessity to perform half-clutch processing for putting the clutch mechanism 40 in half-clutch state, i.e., partial clutching state. More specifically, the half-clutch necessity determination unit 45 utilizes signals from the vehicle speed sensor 36 and accelerator opening angle sensor 37 to ascertain a target operating point dependent on vehicle speed V and required driving force and determines whether the target operating point falls within the low-speed-high-load region AR of FIG. 9A, i.e., whether low-speed-high-load drive should be implemented. In addition, the half-clutch necessity determination unit 45 utilizes a signal from the SOC sensor 39 to determine whether state of charge SOC of the battery 6 is less than predetermined value SOCa. And when operating point is determined to fall within the low-speed-high-load region AR and state of charge SOC is determined to be less than predetermined value SOCa, the half-clutch necessity determination unit 45 determines that performance of half-clutch processing is necessary.

Figure 12A:
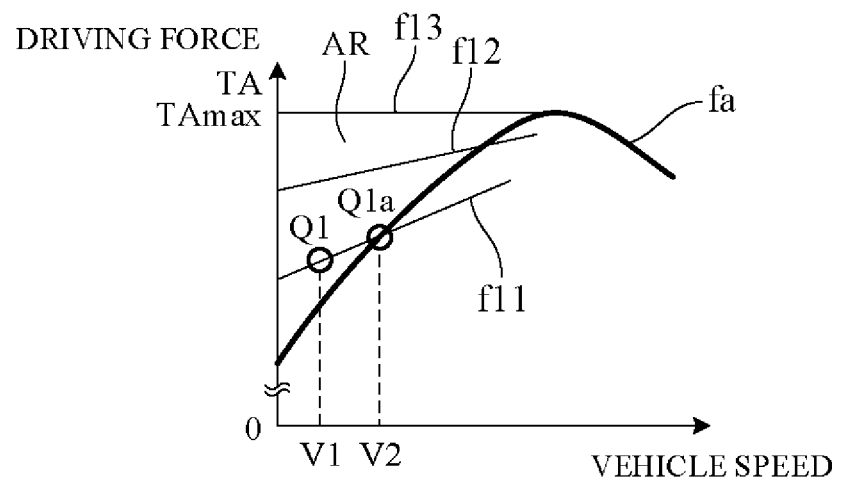
FIG. 12A is a diagram showing an example of operation at half-clutch processing.

When the half-clutch necessity determination unit 45 determines that half-clutch processing needs to be performed, the half-clutch control unit 46 outputs a control signal to the control valve 8a to turn the brake mechanism 30 OFF and control the clutch mechanism 40 to half-clutch state. FIG. 12A is a diagram showing an example of operating points dependent on vehicle speed V and travel driving force TA. Characteristic curves f11, f12 and f13 in the drawing represent required driving force characteristics at predetermined accelerator openings AP1, AP2 and AP3 (e.g., 60%, 80% and 100%, respectively).

As shown in FIG. 12A, when accelerator opening is predetermined value AP1 (characteristic curve f11), for example, vehicle speed V becomes V1 when driving force and running resistance come into balance at operating point Q1 within low-speed-high-load region AR. At this time, the clutch mechanism 40 is controlled to half-clutch state to generate travel driving force exceeding characteristic curve fa. Partial clutching by frictional engagement element slipping is continued so long as operating point remains within low-speed-high-load region AR. When the vehicle accelerates at constant accelerator opening angle owing to development of excess driving force with decreasing running resistance and operating point Q1 moves to operating point Q1a above characteristic curve fa, partial clutching is terminated and the clutch mechanism 40 is engaged (turned ON). Vehicle speed V becomes V2 (>V1) at this point.

While the clutch mechanism 40 is being controlled to half-clutch state by the half-clutch control unit 46, the half-clutch control termination unit 47 determines based on a signal from the clutch temperature sensor 38 whether half-clutch processing needs to be terminated early. This determination is made because when clutch temperature T detected by the clutch temperature sensor 38 is equal to or greater than predetermined value Ta, half-clutch processing needs to be terminated in order to minimize damage to the frictional engagement elements. Moreover, when the half-clutch control termination unit 47 determines half-clutch processing should be terminated, it additionally shifts required driving force characteristics with respect to accelerator opening toward high driving force side.

Figure 12B:
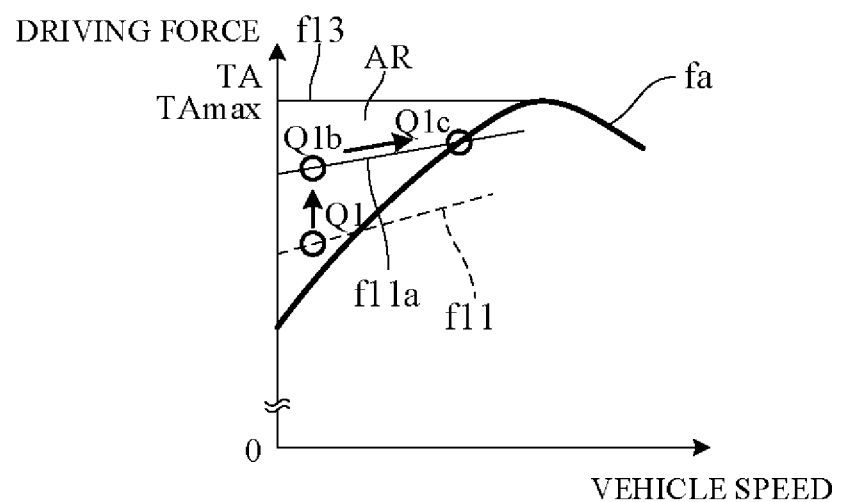
FIG. 12B is a diagram showing an example of operation when termination of half-clutch processing is determined necessary.

FIG. 12B is a diagram showing an example of operation when termination of half-clutch processing is determined necessary. As shown in FIG. 12B, the half-clutch control termination unit 47 shifts accelerator opening characteristic curve f11 to characteristic curve f11a on high driving force side notwithstanding that amount of accelerator operation is unchanged, whereby required driving force operating point moves from Q1 to Q1b. Since the vehicle therefore develops excess driving force, the vehicle accelerates along characteristic curve f11b and operating point moves, for example, from Q1b to Q1c on characteristic curve fa. As a result, half-clutch state terminates and the clutch mechanism 40 turns ON early.

While the half-clutch control unit 46 is implementing half-clutch processing, the SOC restore control unit 48 implements processing for rapidly restoring state of charge (SOC) of the battery 6 (SOC restore processing). This processing is performed, for example, when SOC is at or below a predetermined value that makes rapid restoration of SOC necessary. The SOC restore control unit 48 increases rotational speed NMG1 of the first motor-generator 2 to predetermined rotational speed NMG1a while holding engine speed Ne to or below predetermined rotational speed Nea. For example, predetermined rotational speed Nea corresponds to engine speed Ne at which the engine 1 develops maximum torque. Predetermined rotational speed NMG1a is set with consideration to, inter alia, speed change mechanism 70 strength and current state of charge of the battery 6, so as to satisfy a condition of rotational speed of the first motor-generator 2 being not higher than upper limit rotational speed of the first motor-generator 2 and rotational speed difference between the second sun gear 21 and the second ring gear 22 being greater than 0 (half-clutch state).

Figure 13A:
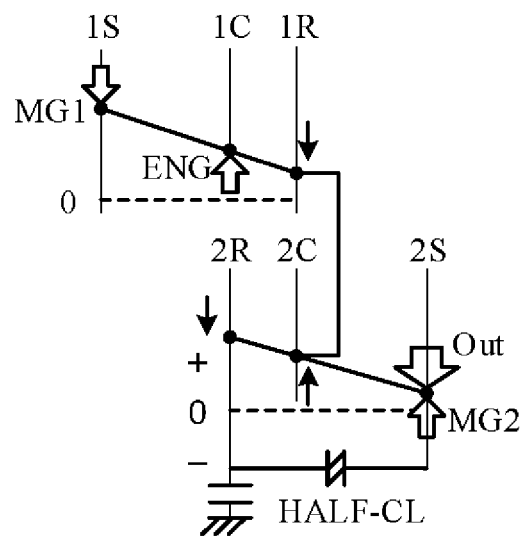
FIG. 13A is a diagram showing an example of alignment charts before performing SOC restore processing during implementation of half-clutch processing.
Figure 13B:
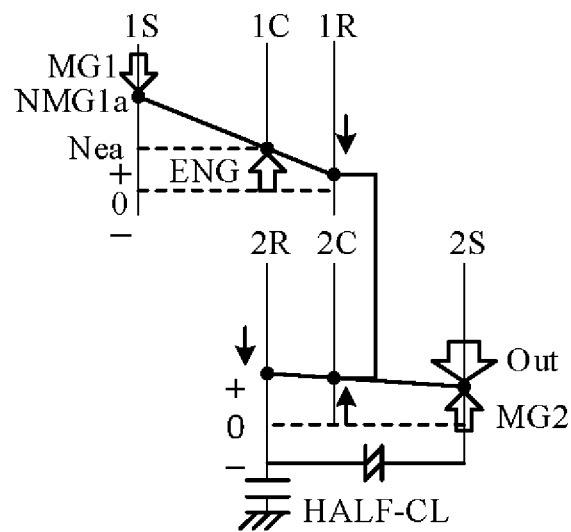
FIG. 13B is a diagram showing an example of alignment charts after performing SOC restore processing during implementation of half-clutch processing.

FIGS. 13A and 13B are diagrams showing examples of alignment charts before and after performing SOC restore processing during implementation of half-clutch processing. As shown in FIG. 13A, when half-clutch processing is being performed, unlike in HV low mode (FIG. 9E), rotational speed difference arises between the second ring gear (2R) 22 and the second sun gear (2S), namely, rotational speed of the second ring gear (2R) 22 is higher than rotational speed of the second sun gear (2S) 21.

From this state, as shown in FIG. 13B, rotational speed NMG1 of the first motor-generator (MG1) 2 is increased to predetermined rotational speed NMG1a while keeping engine speed Ne at predetermined rotational speed Nea. This increases electric power generation by the first motor-generator 2, thereby enabling quick restoration of SOC. Since rotational speed of the first ring gear (1R) 12 decreases along with increasing rotational speed of the first motor-generator 2 at this time, rotational speeds of the second carrier (2C) 24 and second ring gear 22 decrease. Since this decreases rotational speed difference between the second ring gear 22 and the second sun gear 21, generation of heat by the clutch mechanism 40 owing to partial clutching can be minimized.

Figure 14:
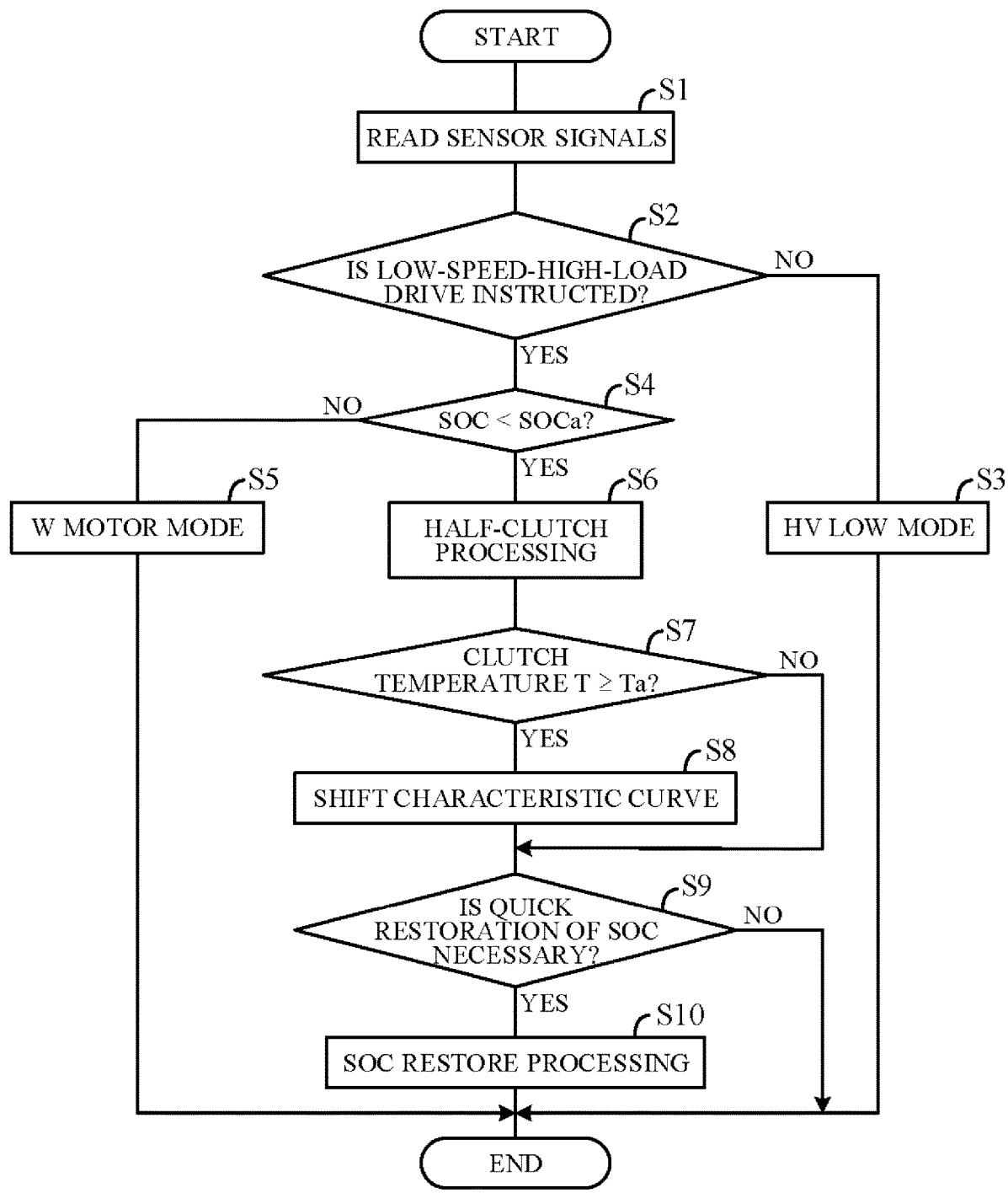
FIG. 14 is a flowchart showing an example of processing performed by a controller of FIG. 11.

FIG. 14 is a flowchart showing an example of processing performed by the CPU of the controller 4 of FIG. 11 in accordance with a program stored in memory in advance. The processing indicated by this flowchart is commenced, for example, when upon starting up a slope, towing or the like vehicle speed is detected to be equal to or less than predetermined value (e.g., Va of FIG. 10A) and required driving force is detected to be equal to or greater than predetermined value (e.g., TA1 of FIG. 10A) based on signals from the vehicle speed sensor 36 and accelerator opening angle sensor 37, and is repeatedly performed at predetermined intervals insofar as vehicle speed of or less than the predetermined value and required driving force of or greater than the predetermined value are detected.

First, in S1 (S: processing Step), signals are read from the vehicle speed sensor 36, accelerator opening angle sensor 37, clutch temperature sensor 38, and SOC sensor 39. Next, in S2, whether operating point determined by vehicle speed V and required driving force falls within predetermined low-speed-high-load region AR of FIG. 10A, i.e., whether low-speed-high-load drive is instructed, is determined. If a negative decision is made in S2, the routine proceeds to S3, in which the engine 1 is started and a control signal is output to the control valve 8a to switch drive mode to HV low mode by turning the brake mechanism 30 OFF and the clutch mechanism 40 ON. If a positive decision is made in S2, the routine proceeds to S4.

In S4, whether SOC detected by the SOC sensor 39 is less than predetermined value SOCa is determined. If a negative decision is made in S4, the routine proceeds to S5 to switch drive mode to W motor mode by stopping the engine 1 and outputting a control signal to the control valve 8a instructing it to turn the brake mechanism 30 OFF and turn the clutch mechanism 40 ON. Therefore, it is possible to generate maximum driving force TBmax in vehicle low speed range (FIG. 10B), and to achieve low-speed-high-load drive. Since half-clutch processing of the clutch mechanism 40 is not performed in this case, generation of heat by the frictional engagement elements is inhibited. On the hand, if a positive decision is made in S4, the routine proceeds to S6.

In S6, the engine 1 is started and a control signal is sent to the control valve 8a instructing it to turn the brake mechanism 30 OFF and control the clutch mechanism 40 to half-clutch state, thereby implementing half-clutch processing. Since this increases travel driving force to greater than when in HV low mode, low-speed-high-load drive that meets required driving force can be achieved. Next, in S7, whether clutch temperature T detected by the clutch temperature sensor 38 is equal to or greater than predetermined value Ta is determined. If a positive decision is made in S7, the routine proceeds to S8, and if a negative decision is made, the routine passes S8 and proceeds to S9.

In S8, required driving force characteristics are shifted to high-driving-force side. For example, as shown in FIG. 12B, characteristic curve f11 corresponding to accelerator opening is changed to characteristic curve F11a on high-driving-force side. Since required driving force therefore rises, actual driving force under half-clutch processing increases. Since vehicle speed therefore increases owing to development of excess driving force, operating point can be moved to outside low-speed-high-load region AR (onto characteristic curve fa). When operating point moves outside low-speed-high-load region AR, half-clutch processing can be terminated to thereby minimize temperature increase of frictional engagement elements of the clutch mechanism 40.

Next, in S9, whether quick restoration of SOC is necessary is determined. For example, when SOC detected by the SOC sensor 39 is less than predetermined value SOCa, a positive decision in S9 is made and the routine proceeds to S10. If a negative decision is made in S9, processing is terminated.

In S10, engine speed Ne is held to or below predetermined rotational speed Nea, and a control signal is output to the power control unit 5 instructing it to increase rotational speed NMG1 of the first motor-generator 2 to predetermined rotational speed NMG1a (SOC restore processing). Since this increases power generation amount by the first motor-generator 2, it enables quick restoration of SOC. And since rotational speed difference between the second sun gear 21 and the second ring gear 22 decreases concurrently, generation of heat by the clutch mechanism 40 is suppressed.

Figure 15:
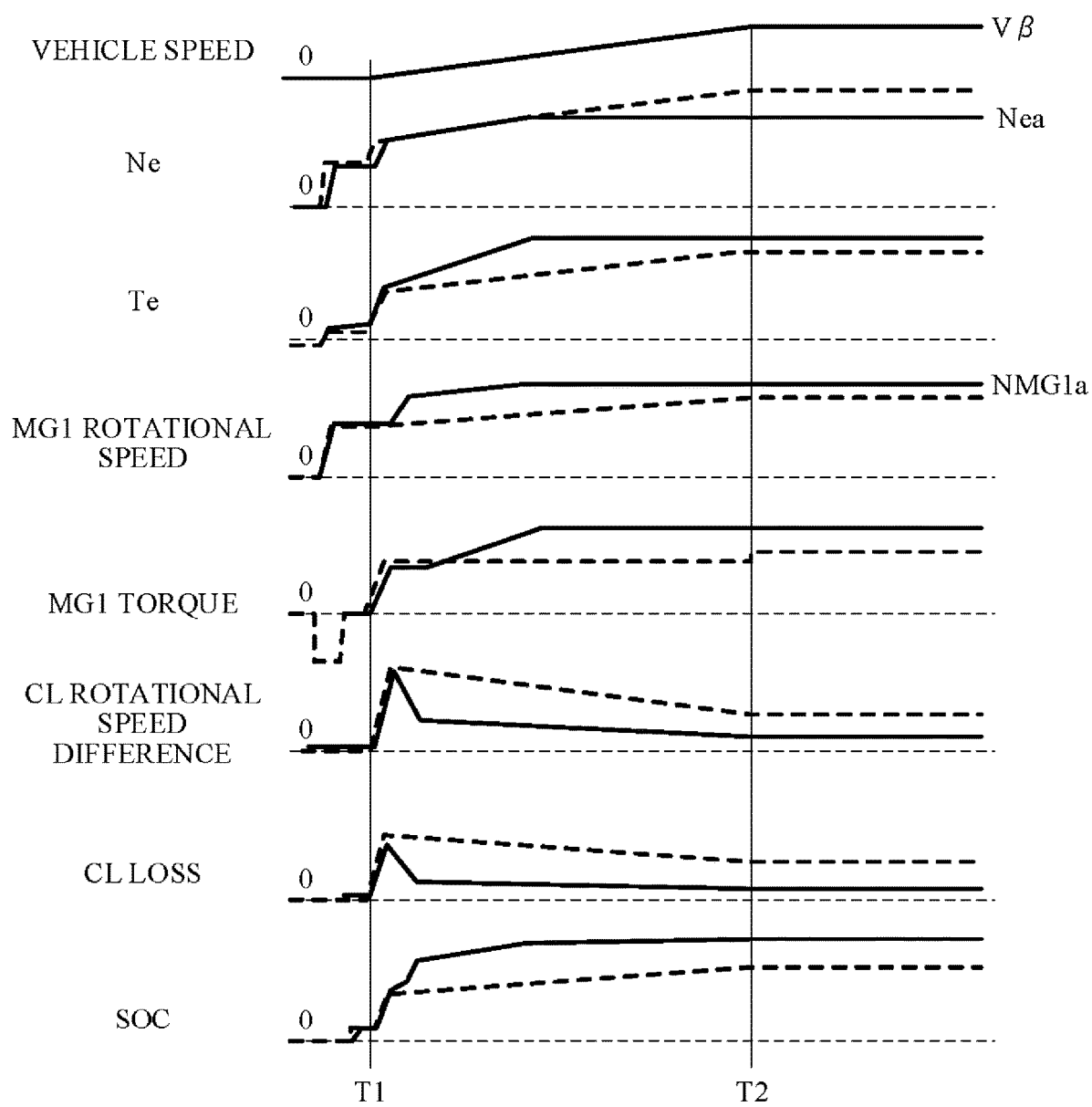
FIG. 15 is a time chart showing examples of operations for case of performing and case of not performing SOC restore processing.

FIG. 15 is a time chart indicating, respectively for case of performing and case of not performing SOC restore processing, examples of time-course change of vehicle speed, engine speed Ne, engine torque Te, rotational speed of first motor-generator 2 (MG1 rotational speed), torque of the first motor-generator 2 (MG1 torque), rotational speed difference between frictional engagement elements of the clutch mechanism 40 (CL rotational speed difference), torque transmission loss in the clutch mechanism 40 (CL loss), and SOC. In the drawing, solid lines represent characteristics when SOC restore processing performed and dotted lines represent characteristics when SOC restore processing not performed.

In the time sequence assumed in FIG. 15, the engine 1 is started before time t1, and the vehicle starts moving when half-clutch processing for performing low-speed-high-load drive is started at time t1. Vehicle speed V thereafter gradually increases to reach vehicle speed of predetermined vehicle speed VP (not higher than Va; e.g., about 10 km/h) at time t2, whereafter the vehicle travels at constant vehicle speed of predetermined vehicle speed Vβ. At this time, engine speed is held to predetermined rotational speed Nea and MG1 rotational speed is increased to predetermined rotational speed NMG1a. As a result, SOC increase is greater in case of SOC restore processing implemented (solid line) than in case of SOC restore processing not implemented (dotted line), thereby enabling rapid restoration of SOC to predetermined level. Moreover, since CL rotational speed difference is smaller when SOC restore processing implemented, CL loss can be reduced The present embodiment can achieve advantages and effects such as the following:

(1) The drive system 100 of the hybrid vehicle according to the present invention includes: the internal combustion engine 1; the first motor-generator 2; the first power transmission path 71 and the second power transmission path 72 connected with each other in series; the first planetary gear mechanism 10 connected to the engine 1 for dividing and outputting motive power generated by the engine 1 to between the first motor-generator 2 and the first power transmission path 71; the second motor-generator 3 connected to the second power transmission path 72; the clutch mechanism 40 having the mutually engageable and disengageable frictional engagement elements (plates 41 and disks 42), and making and breaking the first power transmission path 71 in accordance with engaging action and disengaging action of the frictional engagement elements; the half-clutch necessity determination unit 45 for determining necessity of low-speed-high-load region drive exceeding characteristic curve fa of travel driving force that is sum of driving force output through the first power transmission path 71 (mechanical path) and driving force of the second motor-generator 3, at not greater than predetermined vehicle speed Va; and the controller 4 for controlling, inter alia, the engine 1, first motor-generator 2, second motor-generator 3, and clutch mechanism 40 (FIGS. 1, 2, 10A and 11). The controller 4 is responsive to determination by the half-clutch necessity determination unit 45 that low-speed-high-load drive is necessary, for controlling the clutch mechanism 40 to half-clutch state, and responsive to determination thereby that low-speed-high-load drive is not necessary, for turning ON (connecting) or OFF (disconnecting) the clutch mechanism 40 (FIG. 14).

Thus, when operating point determined by vehicle speed and required driving force exceeds travel driving force characteristic curve fa, addition of driving force through the mechanical path to the driving force of the second motor-generator 3 can be achieved, even in a region not higher than predetermined vehicle speed Va, by controlling the clutch mechanism 40 capable of making and breaking the first power transmission path 71 to half-clutch state. Therefore, low-speed-high-load drive or constant vehicle speed travel at low speed and high load, such as at uphill start-off or towing, can be achieved even in cases such as when running in W motor mode is impossible owing to deficient SOC.

(2) The drive system 100 of the hybrid vehicle further includes the SOC sensor 39 for detecting SOC of the battery 6 that powers the first motor-generator 2 and second motor-generator 3 (FIG. 11). When the half-clutch necessity determination unit 45 determines that low-speed-high-load drive is necessary and the SOC sensor 39 detects SOC of less than predetermined value SOCa, the controller 4 controls the clutch mechanism 40 to half-clutch state. On the other hand, even if the half-clutch necessity determination unit 45 determines that low-speed-high-load drive is necessary, the controller 4 nevertheless turns the clutch mechanism 40 ON to transmit motive power of the first motor-generator 2 through the first power transmission path 71 to the second power transmission path 72 so long as the SOC sensor 39 detects SOC of or greater than predetermined value SOCa (FIG. 14). So since traveling in W motor mode is given priority over half-clutch processing when SOC is predetermined value SOCa or greater, the clutch mechanism 40 need not be put in half-clutch state and temperature increase of the frictional engagement elements caused by half-clutch processing can therefore be minimized.

(3) The drive system 100 of the hybrid vehicle further includes: the one-way clutch 50 interposed between the output shaft 27 of the first power transmission path 71 and the output gear 51 (input shaft) of the second power transmission path 72 and configured so that when in locked state the output shaft 27 and the output gear 51 rotate integrally and when in unlocked state the output gear 51 rotates relative to the output shaft 27; and the speed change mechanism 70 provided on the first power transmission path 71 for switching drive mode (FIG. 1). The first planetary gear mechanism 10 includes the first sun gear 11 connected to the first motor-generator 2, the first carrier 14 connected to the engine 1, and the first ring gear 12 (FIG. 1). The speed change mechanism 70 includes: the second planetary gear mechanism 20 including the second sun gear 21 connected to the output shaft 27, the second carrier 24 connected to the first ring gear 12 and the second ring gear 22; and the clutch mechanism 40 (FIG. 1). The clutch mechanism 40 is configured to engage (connect) or disengage (disconnect) the second sun gear 21 and second ring gear 22 (FIG. 2). When the half-clutch necessity determination unit 45 determines that low-speed-high-load drive is necessary and the SOC sensor 39 detects SOC of less than predetermined value SOCa, the controller 4 controls the clutch mechanism 40 to half-clutch state and additionally controls the engine 1 and the first motor-generator 2 (power control unit 5) so as to increase rotational speed of the first motor-generator 2 (FIG. 14). Since this increases power generation by the first motor-generator 2, it enables rapid recovery of SOC. It also reduces difference of rotational speed of the frictional engagement elements of the clutch mechanism 40, thereby helping to lower heat generation by the frictional engagement elements. Moreover, owing to the provision of the one-way clutch 50 upstream of the second motor-generator 3, drive mode can be smoothly switched while preventing negative acceleration due to pull back of torque, without adversely affecting travel driving force even if frictional engagement elements of the speed change mechanism 70 are engaged during driving by the second motor-generator 3, such as in EV mode.

(4) The drive system 100 of the hybrid vehicle further includes the clutch temperature sensor 38 for detecting temperature of frictional engagement elements of the clutch mechanism 40 (FIG. 11). When temperature detected by the clutch temperature sensor 38 is equal to or higher than predetermined value Ta, the controller 4 shifts the required driving force characteristics (f11) farther to high driving force side than when detected temperature is less than predetermined temperature Ta and controls the engine 1, motor-generators 2 and 3, speed change mechanism 70 and the like in accordance with the shifted characteristics (f11a) (FIG. 12B). Since the vehicle therefore accelerates owing to development of excess driving force, operating point moves outside low-speed-high-load region AR, thereby enabling early termination of half-clutch processing. Damage to frictional engagement elements of the clutch mechanism 40 can therefore be reduced.

(5) The speed change mechanism 70 further includes the brake mechanism 30 that brakes (or does not brake) rotation of the second ring gear 22 (FIG. 1). When drive mode is changed to EV mode, the controller 4 controls the control valve 8a so as to release the brake mechanism 30 and release the clutch mechanism 40, and when changed to HV mode, it controls the control valve 8a so as to engage either the brake mechanism 30 or the clutch mechanism 40 and disengage the other thereof. This enables typical drive modes of a hybrid vehicle, namely, EV mode and HV mode, to be readily implemented with a simple configuration solely for controlling engaging actions of the brake mechanism 30 and the clutch mechanism 40.

Various modifications of the aforesaid embodiment are possible. Some examples are explained in the following. In the aforesaid embodiment (FIG. 1), the first power transmission path 71 serving as a mechanical path is made or broken by the clutch mechanism 40 having mutually engageable and disengageable frictional engagement elements (plates 41 and disks 42). However, a clutch portion is not limited to this configuration. For example, the brake mechanism 30 can be utilized as a clutch portion. In the aforesaid embodiment (FIG. 11), the half-clutch necessity determination unit 45 is adapted to determine necessity of drive in region AR exceeding characteristic curve fa of driving force that is sum of driving force output through the first power transmission path 71 and driving force of the second motor-generator 3 at not greater than predetermined vehicle speed Va, i.e., necessity of low-speed-high-load drive. However, a determination unit is not limited to this configuration.

Processing performed by the controller 4 serving as an electronic control unit is not limited to that set out in the foregoing. Namely, the control unit (microprocessor) can be of any configuration insofar as adapted at least to control a clutch portion to half-clutch state when low-speed-high-load drive is determined to be necessary and to connect the clutch portion when low-speed-high-load drive is determined to be unnecessary. For example, half-clutch processing can always be performed when low-speed-high-load drive is determined to be necessary, without taking into account whether SOC is less than predetermined value SOCa. Optionally, a configuration can be adopted that disconnect the clutch portion when low-speed-high-load drive is determined to be unnecessary. In the aforesaid embodiment (FIG. 11), state of charge (SOC) of the battery 6 as a rechargeable battery is detected by the SOC sensor 39. However, a state of charge detector is not limited to this configuration. In aforesaid embodiment (FIG. 11), temperature of the clutch mechanism 40 is detected by the clutch temperature sensor 38. However, a temperature detector is not limited to this configuration.

In the aforesaid embodiment (FIG. 1), the speed change mechanism 70 includes the second planetary gear mechanism 20, brake mechanism 30 and clutch mechanism 40, and drive mode is changed in accordance with operations of the speed change mechanism 70. However, a mode change mechanism is not limited to this configuration. The speed change mechanism 70 need not have one each of a brake mechanism and a clutch mechanism, but can instead have a pair of brake mechanisms or a pair of clutch mechanisms. In the aforesaid embodiment (FIG. 1), the first planetary gear mechanism 10 is adapted to divide motive power generated by the engine 1 to the first motor-generator 2 and the second carrier 24 of the first power transmission path 71. However, a power division mechanism is not limited to the aforesaid configuration.

The above embodiment can be combined as desired with one or more of the above modifications. The modifications can also be combined with one another.

According to the present invention, it is possible to easily achieve high-load drive at low speed even if a battery is low state of charge.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
an internal combustion engine;
a first motor-generator;
a power transmission path including a first power transmission path and a second power transmission path connected with each other in series;
a power division mechanism connected to the internal combustion engine to divide a power generated by the internal combustion engine to the first motor-generator and the first power transmission path;
a second motor-generator connected to the second power transmission path;
a clutch portion including friction elements engageable and disengageable with each other to connect or disconnect so as to make or break the first power transmission path in accordance with an engagement and an disengagement of the friction elements; and
an electronic control unit including a microprocessor and a memory and configured to perform controlling the internal combustion engine, the first motor-generator, the second motor-generator and the clutch portion, wherein
the microprocessor is configured to perform determining whether a drive in a region exceeding a characteristic curve of a driving force defined by a sum of a driving force output through the first power transmission path and a driving force of the second motor-generator at a range of a vehicle speed smaller than or equal to a predetermined vehicle speed is necessary, and
the controlling including controlling the clutch portion to a half-clutch state when determining that the drive in the region is necessary, while connecting or disconnecting the clutch portion when determining that the drive in the region is not necessary.

2. The drive system according to claim 1, further comprising
a state of charge detector configured to detect a state of charge of a rechargeable battery supplying an electrical power to the first motor-generator and the second motor-generator, wherein
the microprocessor is configured to perform
the controlling including controlling the clutch portion to the half-clutch state when determining that the drive in the region is necessary and the state of charge detected by the state of charge detector is less than a predetermined value, while connecting the clutch portion so that a torque of the first motor-generator is transmitted to the second power transmission path through the first power transmission path when the state of charge detected by the state of charge detector is greater than or equal to the predetermined value, even if determining that the drive in the region is necessary.

3. The drive system according to claim 2, further comprising:
a one-way clutch interposed between an output shaft in the first power transmission path and an input shaft in the second power transmission path so that the output shaft and the input shaft integrally rotate in a locked state and the input shaft rotates relative to the output shaft in an unlocked state; and
a mode change mechanism provided in the first power transmission path to change a drive mode, wherein
the power division mechanism includes a first planetary gear mechanism having a first sun gear connected to the first motor-generator, a first carrier connected to the internal combustion engine, and a first ring gear,
the mode change mechanism includes the clutch portion and a second planetary gear mechanism having a second sun gear connected to the output shaft, a second carrier connected to the first ring gear, and a second ring gear,
the clutch portion is configured to connect or disconnect the second sun gear and the second ring gear, and
the microprocessor is configured to perform
the controlling including controlling the clutch portion to the half-clutch state and controlling the internal combustion engine and the first motor-generator so as to increase a rotational speed of the first motor-generator when determining that the drive in the region is necessary and the state of charge detected by the state of charge detector is less than the predetermined value.

4. The drive system according to claim 3, wherein
the mode change mechanism further includes a brake portion configured to brake or non-brake the second ring gear,
the microprocessor is further configured to perform controlling the brake portion, and
the microprocessor is configured to perform
the controlling including controlling the brake portion so as to non-brake the second ring gear and disconnecting the clutch portion when the drive mode is changed to an EV mode in which the hybrid vehicle is driven by a power of the second motor-generator with the internal combustion engine stopped, while controlling the brake portion so as to brake the second ring gear and disconnecting the clutch portion or controlling the brake portion so as to non-brake the second ring gear and connecting the clutch portion when the drive mode is changed to a HV mode in which the hybrid vehicle is driven by the power of the second motor-generator and the power generated by the internal combustion engine.

5. The drive system according to claim 2, wherein
the microprocessor is configured to perform
the controlling including controlling the first motor-generator and the second motor-generator so that the first motor-generator functions as a generator and the second motor-generator functions as a motor when determining that the drive in the region is necessary and the state of charge detected by the state of charge detector is less than the predetermined value, while controlling the first motor-generator and the second motor-generator so that the first motor-generator functions as a motor and the second motor-generator functions as the motor when determining that the drive in the region is necessary and the state of charge detected by the state of charge detector is greater than or equal to the predetermined value.

6. The drive system according to claim 1, further comprising
a temperature detector configured to detect a temperature of the clutch portion, wherein
the microprocessor is configured to perform
the controlling including controlling the internal combustion engine, the first motor-generator, the second motor-generator and the clutch portion in accordance with a first required driving force characteristic when the temperature detected by the temperature detector is less than a predetermined value, while controlling the internal combustion engine, the first motor-generator, the second motor-generator and the clutch portion in accordance with a second required driving force characteristic shifted to a high driving force side than the first required driving force characteristic when the temperature detected by the temperature detector is greater than or equal to the predetermined value.

7. The drive system according to claim 1, wherein
the characteristic curve is set so that the driving force gradually increases to a predetermined driving force along with an increase of a vehicle speed from 0 to the predetermined vehicle speed, and
the region is defined by the characteristic curve, the predetermined driving force and the predetermined vehicle speed.

8. A drive method of a hybrid vehicle, the hybrid vehicle including: an internal combustion engine; a first motor-generator; a power transmission path including a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; and a clutch portion including friction elements engageable and disengageable with each other to connect or disconnect so as to make or break the first power transmission path in accordance with an engagement and an disengagement of the friction elements,
the drive method comprising:
controlling the internal combustion engine, the first motor-generator, the second motor-generator and the clutch portion; and
determining whether a drive in a region exceeding a characteristic curve of a driving force defined by a sum of a driving force output through the first power transmission path and a driving force of the second motor-generator at a range of a vehicle speed smaller than or equal to a predetermined vehicle speed is necessary, wherein
the controlling includes controlling the clutch portion to a half-clutch state when determining that the drive in the region is necessary, while connecting or disconnecting the clutch portion when determining that the drive in the region is not necessary.

* * * * *